United States Patent Office 3,772,202
Patented Nov. 13, 1973

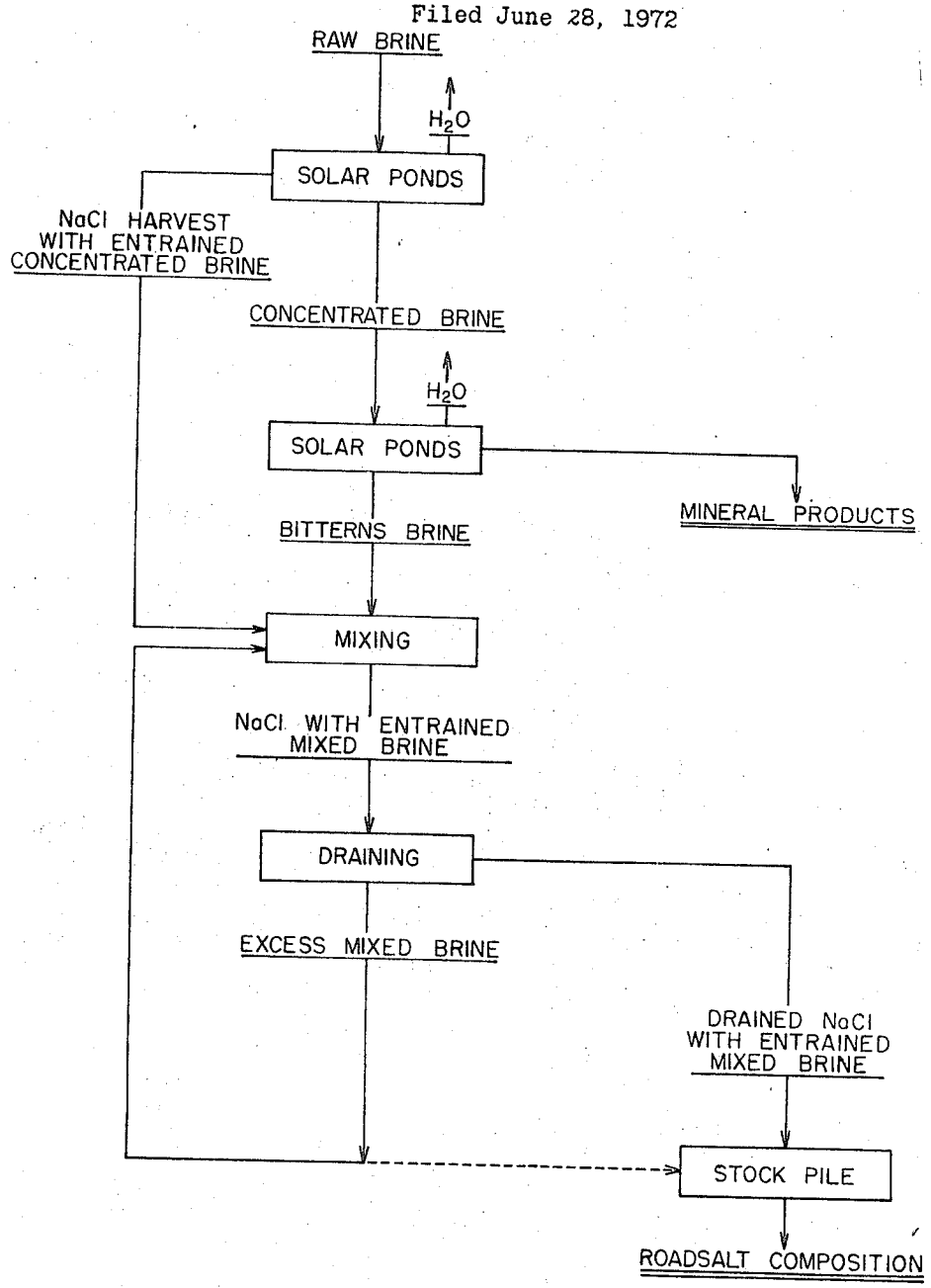

---

3,772,202
MOIST ROAD SALT COMPOSITION AND PROCESS FOR MAKING THE SAME
Ulrich E. G. Neitzel, Heringen (Werra), Germany, and Frederick J. Andreasen, Brigham City, Utah, assignors to Irving Trust Company, as trustee
Filed June 28, 1971, Ser. No. 157,147
Int. Cl. C09k 3/18
U.S. Cl. 252—70
8 Claims

ABSTRACT OF THE DISCLOSURE

A moist road salt composition comprises sodium chloride moistened with entrained brine containing between about 40 and about 75, ideally 45 to 60, moles magnesium chloride per 1000 moles water. The sodium chloride may be obtained by evaporating natural brines such as those from the Great Salt Lake of Utah. The crystal crop, together with entrained brine, may then be mixed with a similar brine having a much higher concentration of magnesium chloride to produce the desired final composition of the brine entrained by the crystal crop.

BACKGROUND OF THE INVENTION

Field

This invention pertains to moist road salt compositions and is specifically directed to moist sodium chloride compositions which will not freeze at temperatures above about −45° C. (about −50° F).

State of the art

The application of sodium chloride, either by itself or in admixture with other salts, such as $MgCl_2$ and/or $CaCl_2$, to surfaces to prevent icing is well-known. These materials are subject to cake or freeze at low temperatures, however, making their application difficult.

Various additives, e.g., water soluble complex iron cyanides, notably sodium ferrous cyanide, and surface active agents, notably polyvinyl alcohol, are added to road salt compositions to inhibit caking caused by recrystallization phenomena. Such additives are apparently ineffective to inhibit caking due to freezing. It is also known to mix small proportions of calcium chloride and/or magnesium chloride to road salt to inhibit freezing down to moderately low temperatures in the neighborhood of −25° C. (−13° F.). These expedients have not been sufficient, however, because in many geographical regions winter temperatures fall far below this temperature.

U.S. Pat. 3,505,234 discloses a deicing composition consisting of sodium chloride in admixture with prescribed quantities of soluble alkali iron cyanide and either calcium chloride or magnesium chloride. According to that patent, the alkaline earth chloride and cyanide compositions are synergistic in effect and sodium chloride treated with a magnesium chloride brine alone would be expected to freeze at moderate temperatures.

SUMMARY OF THE INVENTION

The present invention provides a moist road salt (deicing) composition which remains moist and spreadable at extreme low temperatures, as low as −50° C. (−58° F.). Thus, the composition of this invention remains spreadable under even the most severe winter temperatures normally encountered in the United States or Canada. According to this invention, it has been found that the composition of the brine entrained by the road salt is the critical factor in establishing the temperature at which the composition will freeze. Neither the wieght-percent of alkaline earth metal chloride present in the total composition, the quantity of brine actually entrained by the composition, or the presence or absence of other anticaking agents is of critical importance to the freezing characteristics of the composition, although these parameters will normally be adjusted within the limits desired to enhance other properties of the road salt composition.

The compostions of this invention will include about 2 to about 15, preferably above about 3 percent by weight entrained brine, based upon the total weight of the composition. Moreover, anticaking additives will usually be present in small amounts, typically 1 percent or less by weight. The entrained brine will ordinarily be saturated with respect to $Na_2Cl_2$ and will often contain substanital concentrations (e.g., 10 moles or more) of dissolved alkali metal salts other than $Na_2Cl_2$ (i.e., $Li_2Cl_2$ and/or $K_2Cl_2$) per 1000 moles $H_2O$. (An example of the use of the above double-mole notation may be found in Gunn, "Production of Potassium Sulfate From Naturally Occurring Sodium Sulfate and Potassium Chloride," Canadian Journal of Chemical Engineering, volume 42, August 1964, p. 187 et seq.)

The invention is described hereinafter with reference to the constituents most commonly available in practice, e.g., NaCl and $MgCl_2$. It should be recognized, however, that for purposes of this invention, the alkali metal chlorides are substantially equivalent in behavior. Thus, all or substantial portions of the NaCl could be replaced by KCl and/or LiCl. At present, such compositions are not regarded as of commercial value. Similarly, although the brines presently contemplated as of practical value from the standpoint of this invention contain high concentrations of $MgCl_2$ and relatively little $CaCl_2$, it is recognized that the entrained brine of the road salt compositions of this invention could include substantial concentrations of $CaCl_2$ in place of $MgCl_2$. Of course, the presence of $CaCl_2$ in the brine may alter the optimum concentration of $MgCl_2$, and it is recognized that $CaCl_2$ cannot necessarily replace $MgCl_2$ on a mole-for-mole basis. Those skilled in the art will have no difficulty in applying routine procedures to determine optimum concentrations of $CaCl_2$ to replace all or some part of the $MgCl_2$ in the entrained brine.

The road salt compositions of this invention consist essentially of a particulate solid phase, containing mostly (typically above 90 percent on a dry weight basis) sodium chloride, and an entrained liquid phase comprising an aqueous solution containing between about 40 and about 75 moles $MgCl_2$ per 1000 moles water. Ideally, the entrained solution will contain between about 45 and about 60 moles $MgCl_2$ per 1000 moles water. Rock salt, or other dry mined sodium chloride may be used, but according to the preferred embodiments of the invention, the sodium chloride is obtained by crystallization from a brine under conditions in which no more than minor amounts of other constituents cocrystallize with the sodium chloride, and the entrained brine is saturated with respect to NaCl and contains dissolved $MgCl_2$. Of course, the entrained brine may also contain dissolved alkali metal chlorides in addition to NaCl, and other dissolved constituents such as sulfates, carbonates, borates, organics, etc., in varying concentrations.

In general, the dissolved salts in the entrained aqueous phase should predomiate in $MgCl_2$, and the dissolved salts and water should be present in proportions such that upon cooling sufficiently to cause the crystallization of mineral species from solution until the solution reaches its eutectic composition, sufficient solution remains to keep the composition flowable at all temperatures above the freezing point of the brine.

BRIEF DESCRIPTION OF THE DRAWING

The drawing is a flowsheet illustrating a present preferred procedure for carrying out the invention.

DESCRIPTION OF THE ILLUSTRATED EMBODIMENT

As illustrated, raw brine is introduced to solar ponds wherein it is concentrated sufficiently to produce a sodium chloride crystal crop of acceptable grade for road salt applications. High purity is obviously not required for road salt compositions. Careful control of the evaporative process is thus not required; the presence of other salts, e.g., complex potassium salts, is not detrimental, even in substantial quantities. Usually, however, the crystal crop will contain in excess of about 90 percent by weight NaCl on a dry weight basis.

The raw brines useful for the practice of this invention may contain a variety of constituents, notably sodium, potassium, lithium, magnesium, calcium, chloride and sulfate in varying concentrations. For example, brines which contain substantial concentrations of sulfate do not contain much calcium. Most of the sodium and potassium will be removed from solution before the brine is concentrated to bitterns brine composition, e.g., a magnesium chloride concentration in excess of about 70 moles $MgCl_2$ per 1000 moles water. Moreover, the first constituent to precipitate in any appreciable quantity from the brine undergoing concentration should be sodium chloride.

Sodium chloride is harvested from the solar pond. The harvested crystal crop will naturally contain several weight-percent entrained concentrated brine. The portion of the concentrated brine which is decanted from the crystal crop is transferred to another solar pond wherein it is subjected to additional evaporation, thereby removing other mineral products and producing a bitterns brine. The bitterns brine will contain NaCl, and it will predominate in magnesium choride, although it may contain substantial concentrations of calcium chloride (especially if the initial brine contains little sulfate) and relatively minor concentrations of other constituents, notably potassium, lithium, carbonate and sulfate.

The NaCl harvest (including entrained concentrated brine) is mixed with a portion of the bitterns brine in appropriate quantities to produce a mixed brine (resulting from mixing the entrained concentrated brine of the NaCl harvest and the bitterns brine) containing between about 40 and about 75 moles $MgCl_2$ per 1000 moles water. The NaCl is drained and stockpiled with the excess mixed brine being recycled as shown. A portion of the drained mixed brine may be cycled to the stockpile periodically to maintain a desired amount of entrainment in the salt.

The invention will be better understood by reference to the following specific examples:

Example I

Several brines were prepared by mixing raw brine from the Great Salt Lake of Utah with bitterns brine (brine resulting from concentrating Great Salt Lake brine to above 85 moles $MgCl_2$ per 1000 moles $H_2O$). The composition of the mixed brines are reported in Table 1.

TABLE 1

[Mixed brine composition (moles per 1,000 moles $H_2O$)]

| Brine No. | $MgSO_4$ | $MgCl_2$ | $K_2Cl_2$ | $Na_2Cl_2$ |
|---|---|---|---|---|
| 1 | 6.40 | 81.37 | 0.51 | 1.80 |
| 2 | 6.24 | 61.92 | 0.97 | 5.58 |
| 4 | 6.56 | 50.70 | 1.20 | 10.12 |
| 4 | 6.42 | 40.56 | 1.49 | 16.06 |
| 5 | 6.67 | 30.29 | 1.73 | 22.98 |
| 6 | 6.12 | 20.37 | 1.98 | 31.08 |

A single of each brine was placed in a 14 mm. test tube. The tubes were immersed in a Dry Ice and acetone bath, and the temperature of the bath was gradually decreased. The temperatures at which the brine became a thick slurry and at which the brine became solid were noted and are reported in Table 2.

Separate portions of previously washed and dried NaCl were mixed with each of the brines. The NaCl was completely covered with brine and then placed in a small Gooch crucible, without any filter, wherein it was allowed to drain. The drained moist salt was placed in a 25 mm. test tube, and the tubes were placed in the aforementioned bath. The temperatures at which the treated salt samples became solid were noted and are reported in Table 2.

TABLE 2

[Temperature data for brines of Table 1 and salts treated therewith]

| Brine No. | Slurry too thick to agitate, °F. | Brine freezes, °F. | Treated salt freezes, °F. |
|---|---|---|---|
| 1 | −10 | −38 | −38 |
| 2 | −45 | −60 | −55 |
| 3 | −45 | −55 | −55 |
| 4 | −40 | −55 | −52 |
| 5 | −27 | −50 | −52 |
| 6 | −18 | −50 | −53 |

Example II

A brine of composition intermediate Brines 1 and 2 of Table 1 and containing 75.24 moles $MgCl_2$ per 1000 moles $H_2O$ was tested following the procedure of Example I. The brine froze at about −55° F. and salt treated with the brine froze at about −40° F.

It has been found that at $MgCl_2$ concentrations below about 40 and above about 75 moles per 1000 moles water, various minerals crystallize from solution at relatively high temperatures. This effect is much less pronounced at $MgCl_2$ concentrations between about 45 and about 60 moles per 1000 moles water. Under stockpile conditions, any crystallization phenomena that occur in the entrained brine contribute necessarily to caking of the composition.

Example III

The procedures of Example I were repeated comparing a brine prepared by concentrating Great Salt Lake brine (Brine A) with various simulated brines (Brines B, C and D). Brine compositions and the freezing points of the brines and NaCl treated with the brines are reported in Table 3.

TABLE 3

[Brine compositions (moles per 1,000 moles $H_2O$) and freezing points of brines and treated salts]

| Brine | $MgSO_4$ | $MgCl_2$ | $K_2Cl_2$ | $Na_2Cl_2$ | $Li_2Cl_2$ | Freezing temp., °F. Brine | Salt |
|---|---|---|---|---|---|---|---|
| A | 6.15 | 49.48 | 1.24 | 10.46 | 1.10 | −65 | −62 |
| B | 0 | 47.2 | 0 | 0 | 0 | −60 | −60 |
| C | 6.47 | 49.0 | 0 | 0 | 0 | −60 | --- |
| D | 0 | 49.2 | 0 | 0 | 2.08 | −62 | −60 |

Example IV

Brine from the Great Salt Lake of Utah was introduced to a pond and concentrated to cause the formation of a crystal crop. The $MgCl_2$ concentration of the brine was held to below about 20 moles per 1000 moles $H_2O$ and several samples of substantially pure NaCl crystals were harvested. The concentrated brine entrained by the sample harvests varied in $MgCl_2$ concentration from about 5 to about 15 moles per 1000 moles $H_2O$. The brine was decanted from the solar pond and concentrated further until most of the NaCl, KCl, and $MgSO_4$ values initially in the brine were crystallized. The remaining brine was decanted and contained in excess of 70 moles $MgCl_2$ per 1000 moles water. The thus-concentrated (70 plus moles $MgCl_2$) brine could be mixed in various proportions with the aforementioned samples of NaCl to produce compositions with a solid phase consisting essentially of NaCl and a liquid phase (entrained brine) containing between about 40 and about 75 (preferably 45 to 60) moles $MgCl_2$ per 1000 moles $H_2O$. The compositions were more conveniently produced with concentrated brines containing up to about 95 moles $MgCl_2$ per 1000 moles $H_2O$.

Anticaking additives may be added in conventional amounts to the compositions of this invention. Preferred compositions contain between about 5 and about 75 parts per million on a dry weight basis, based on the NaCl in the solid phase, of a water soluble, alkali metal salt of an iron cyanide, notably potassium ferrocyanide. The ferrocyanides and ferricyanides of sodium and/or potassium constitute the preferred class of anticaking additives.

Example V

To 1000 kilograms of crushed rock salt is mixed an aqueous solution containing 50 moles $MgCl_2$ per 1000 moles water and about ½ percent by weight (based on the total weight of the solution) potassium ferrocyanide. The salt is drained until it contains about 5 percent by weight entrained brine. The resulting composition has excellent anticaking and antifreezing properties at temperatures well below −40° F.

Reference herein to details of specific embodiments is not intended to restrict the scope of the claims which themselves recite the features regarded as essential to the invention and are entitled to a full range of equivalents within the teachings of the disclosure.

We claim:

1. A road salt composition consisting essentially of a particulate solid phase containing at least about 90 percent by weight sodium chloride, and an aqueous solution saturated with NaCl and containing dissolved salts including between about 40 and about 75 moles $MgCl_2$ per 1000 moles $H_2O$ entrained in said solid phase in an amount between about 2 and about 15 percent by weight, based on the total weight of the composition.

2. A composition according to claim 1, wherein the aqueous solution contains between about 45 and about 60 moles $MgCl_2$ per 1000 moles $H_2O$.

3. A composition according to claim 2, wherein the entrained aqueous solution contains up to about 10 moles per 1000 moles $H_2O$ of dissolved salts selected from the group consisting of $Li_2Cl_2$ and $K_2Cl_2$.

4. A composition according to claim 2, containing about 5 to about 75 parts per million by weight, based on the dry weight of the NaCl in the solid phase, of a water soluble alkali metal salt of an iron cyanide.

5. A composition according to claim 1, wherein the dissolved salts and water are present in proportions such that upon cooling sufficiently to cause the crystallization of minerals until there is formed a residual brine of eutectic composition, there remains sufficient said residual brine to keep the composition flowable at all temperatures above the freezing point of said residual brine.

6. A composition according to claim 5, wherein the aqueous phase contains between about 45 and about 60 moles $MgCl_2$ per 1000 molse $H_2O$.

7. A composition according to claim 6, wherein the entrained aqueous phase contains up to about 10 moles per 1000 moles $H_2O$ of dissolved salts selected from the group consisting of $Li_2Cl_2$ and $K_2Cl_2$.

8. A composition according to claim 6, containing about 5 to about 75 parts per million by weight, based on the dry weight of the NaCl in the solid phaase, of a water-soluble, alkali metal salt of an iron cyanide.

References Cited

UNITED STATES PATENTS

| | | | |
|---|---|---|---|
| 1,598,935 | 9/1926 | Robison | 23—303 |
| 2,988,509 | 6/1961 | Schilberg | 252—70 |
| 3,350,315 | 10/1967 | Schneider | 252—70 |
| 3,378,493 | 4/1968 | Jacoby et al. | 252—70 |
| 3,505,234 | 4/1970 | Pinkernelle et al. | 252—70 |
| 3,556,718 | 1/1971 | Bachmann et al. | 252—70 X |
| 3,589,871 | 6/1971 | Neitzel | 23—298 |
| 3,592,615 | 7/1971 | Neitzel | 23—298 |
| 3,615,259 | 10/1971 | Neitzel | 23—298 |

LEON D. ROSDOL, Primary Examiner

H. A. PITLICK, Assistant Examiner

U.S. Cl. X.R.

23—298, 303, 304

UNITED STATES PATENT OFFICE
CERTIFICATE OF CORRECTION

Patent No. 3,772,202         Dated Nov. 13, 1973

Inventor(s)  U.E.G. Neitzel and Frederick J. Andreasen

It is certified that error appears in the above-identified patent and that said Letters Patent are hereby corrected as shown below:

Col. 3, line 74, change "single" to --sample--;

Col 6, line 16, change "molse" to --moles--.

Signed and sealed this 23rd day of April 1974.

(SEAL)
Attest:

EDWARD M. FLETCHER, JR.         C. MARSHALL DANN
Attesting Officer             Commissioner of Patents